No. 613,489. Patented Nov. 1, 1898.
J. G. BUEHLER.
BALL BEARING.
(Application filed Aug. 9, 1897.)
(No Model.)
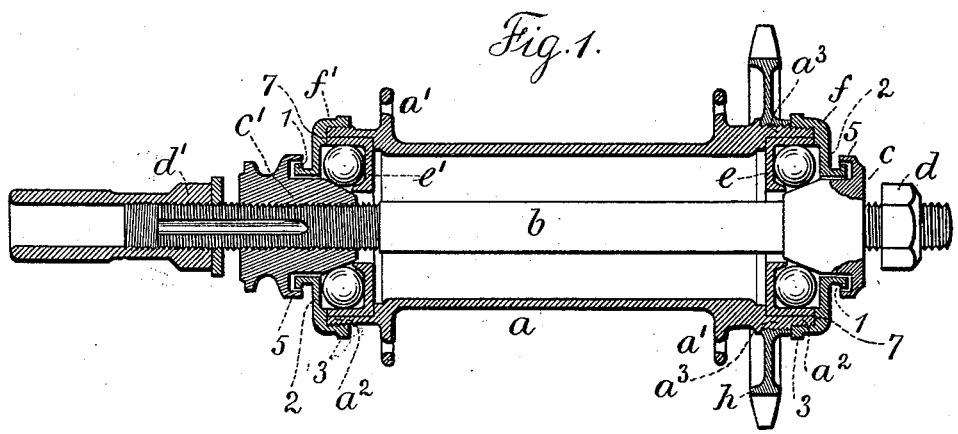
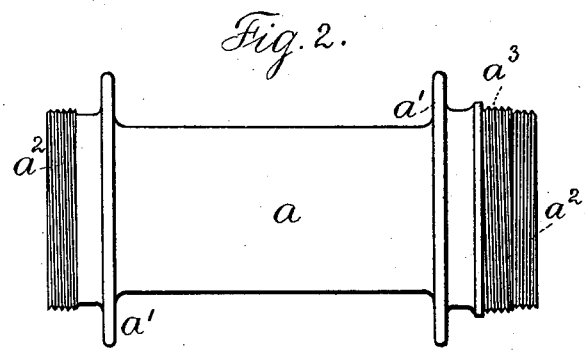
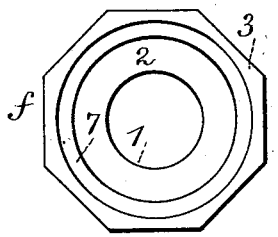 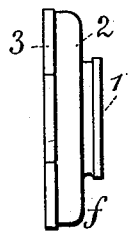 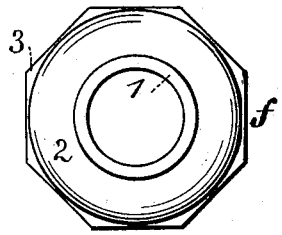
Witnesses:
J. Staib
Chas. H. Smith
Inventor:
John G. Buehler
by L. W. Serrell & Son
Attys.

UNITED STATES PATENT OFFICE.

JOHN G. BUEHLER, OF NEW YORK, N. Y., ASSIGNOR TO BUEHLER & PLATT, OF SAME PLACE.

BALL-BEARING.

SPECIFICATION forming part of Letters Patent No. 613,489, dated November 1, 1898.

Application filed August 9, 1897. Serial No. 647,516. (No model.)

*To all whom it may concern:*

Be it known that I, JOHN G. BUEHLER, a citizen of the United States, residing at New York, (Brooklyn,) in the county of Kings and State of New York, have invented an Improvement in Ball-Bearings, of which the following is a specification.

My invention relates, essentially, to ball-bearings for the wheels of bicycles, and particularly to a means for retaining the balls in their races and excluding dust therefrom, and at the same time locking the ball-races in place in the hub and the removable sprocket in place upon the hub.

In carrying out my invention the respective ends of the wheel-hub are exteriorly threaded and the ball-races fit within the open ends of the hub, and I provide caps, each integrally comprising a tubular center, a disk, and a flange, the flanges being interiorly threaded and screwing upon the ends of the hub, and the tubular centers receive the axle and cones. These caps fitting over the ends of the axles also form an agreeable and pleasing finish thereto. One end of the hub is exteriorly threaded in addition to the aforesaid threads for the cap to provide for the removable sprocket, the threads of one part being in the opposite direction to those of the other, so that if the sprocket, as is preferable, screws upon the hub with a right-hand thread the cap screws on with a left-hand thread and its edge comes up against the sprocket to lock the same in place. The edges of the respective ball-races in the ends of the hub are preferably made flush with the ends of the hub, and the respective caps that screw upon the hub come up against the ends of the hub and the edges of the ball-races, so that the position of the ball-races is assured by a locking action by the caps that prevents the possibility of any movement, and I prefer to form the tubular center of each cap with a rib to fit in a recess of each cone and to finish the flange with an eight or ten sided periphery.

In the drawings, Figure 1 is a longitudinal section of the parts representing my improvement. Fig. 2 is an elevation of the wheel-hub alone. Fig. 3 is a face view, Fig. 4 an edge view, and Fig. 5 a rear view, of the end cap.

The hub is shown at $a$, and upon the same are the usual spoke-flanges $a'$, the ends of the hub at $a^2$ being exteriorly threaded and at $a^3$ also exteriorly threaded upon a surface of slightly-larger diameter and with a thread running in the opposite direction to receive the sprocket $h$.

The axle $b$ and the nuts $d\ d'$ are of usual construction. The cones $c\ c'$ upon the axle are also of usual construction, except that I prefer to make said cones with recessed flanges 5 which are of greater diameter than the cones proper.

The ball-races $e\ e'$ are of angular or curved section and with parallel peripheries to fit the open ends of the hub up to shoulders or stops provided therein, so that when said ball-races are in position their outer edges are flush with the ends of the hub.

The end caps are shown at $f\ f'$. The tubular center 1, the vertical disk 2, and the flange 3 are integral and constitute the end caps $f\ f'$. The tubular center is preferably made with a rib upon the outer periphery and is slightly larger in the open center than the cone that passes therein and surrounds the axle.

The flange 3 is of greater diameter than the hub and interiorly threaded and screwed upon the end of the hub, the periphery of the flange being preferably made eight or ten sided to receive a wrench which may be used to tighten the same securely upon the hub.

The inner face of the disk portion 2 of the cap and adjacent to the flange is preferably provided with a raised annular surface 7, which when the cap is in place upon the hub comes against the end of the hub and the edge of the ball-race to prevent the possibility of any movement of the ball-race in the hub.

The position of each cap upon the end of the axle is by prearrangement such that the distance between the inner edge thereof and the inner edge of the ball-race is less than the diameter of the balls, so that when the balls are placed in the race and the cap screwed down upon the end of the hub said cap forms a ball-retainer to prevent the balls leaving the race when the cones and axle are withdrawn. The tubular center portion of the cap comes within the recessed flange of the cone, the rib of the tubular center almost filling the recess of the cone. This construction prevents the entrance of dust or water into the ball-bearing, and while the parts are necessarily made with mechanical nicety there is yet ample freedom for the rotation of the hub around the cones.

The sprocket $h$ screws upon the threaded portion $a^3$ at one end of the hub, preferably with a right-hand movement, and the cap $f$ preferably screws upon the threaded end $a^2$ with a left-hand movement, and when in place its edge comes up against the edge of the sprocket as well as the inner annular surface against the end of the hub and ball-race, so that the cap $f$ acts as a lock-nut to the sprocket $h$.

I am aware that a ball race or cup has been introduced into a flanged cap and that the latter has been screwed into the wheel-hub. I have found it difficult to make the wheel run true when the parts are thus constructed in consequence of the screw-thread and its flange intervening between the ball race or cup and the hub of the wheel, and in cases where the ball race or cup has been placed within the hub it has been necessary to employ oppositely-placed adjacent cones.

In my present improvement the ball race or cup, having a substantially flat bottom and a cylindrical rim, is introduced and tightly fitted into the end of the hub and remains concentric and true, and the cap that is screwed upon the outside of the hub simply retains the balls and excludes dust, such balls running against the cone upon the axle.

I claim as my invention—

1. In a ball-bearing, a tubular hub threaded exteriorly at one end with a thread running in one direction and with an adjacent threaded surface of greater diameter with the thread running in a direction opposite to that of the aforesaid thread, in combination with a sprocket screwed on the threaded portion of greatest diameter, a cap having an interiorly-threaded flange screwed upon the threaded end of the hub of least diameter and against the sprocket to lock the same in place, and fitting closely around the cone of the axle to form a dust-cap and at the same time a ball-retainer, the axle and cones being removable without disturbing the caps, substantially as set forth.

2. The combination with the tubular hub recessed at the ends, of the circular ball-races having a substantially flat base and cylindrical rim fitting tightly within and substantially flush with the recessed ends of the hub, caps each with a circular opening and an interiorly-threaded flange by which they are screwed upon the outside of and against the ends of the hub and come into close proximity with the rows of balls to form retainers, the axle passing freely through the hub and caps and the circular opening of the caps fitting closely around the cones to exclude dust, the axle and cones being removable without disturbing the caps, substantially as set forth.

Signed by me this 4th day of August, 1897.

JOHN G. BUEHLER.

Witnesses:
 GEO. T. PINCKNEY,
 HAROLD SERRELL.